United States Patent Office 3,518,329
Patented June 30, 1970

3,518,329
PREPARATION OF DIPHENYLOLPROPANE GRANULES
Johan W. Hoogendonk, Geleen, Netherlands, assignor to Stamicarbon N.V., Heerlen, Netherlands
No Drawing. Filed Nov. 22, 1967, Ser. No. 684,934
Claims priority, application Netherlands, Nov. 26, 1966, 6616683
Int. Cl. B01j *2/04;* B29c *23/00*
U.S. Cl. 264—13                                 4 Claims

ABSTRACT OF THE DISCLOSURE

A process is described for the preparation of an improved solid form of diphenylolpropane wherein a melt of this substance is sprayed through a prilling tower wherein the gaseous coolant contains diphenylolpropane seeding material, and the droplet temperature is reduced to approximately 60° C. in a fall of 7 meters. Substantially dust-free, strong prills of reduced electrostatic characteristics and improved free flowing characteristics, are obtained by this process.

BACKGROUND OF THE INVENTION

This invention relates to the preparation of granules of diphenylolpropane. Diphenylolpropane (hereinafter referred to as DPP) has conventionally been made in the form of flakes, by cooling a melt thereof on a rotary cooler. The flakes are obtained by scraping the resulting solid mass off the cooler.

Such flakes present handling difficulties. Initially they are sticky, but finally they become brittle, and the resulting irregular flakes readily pulverize to produce a mass containing a high percentage of dust. This condition interferes with the regular dry feed rate of the product and also gives rise to troubles during withdrawal from storage supply and discharging from bulk cars. The material is also very liable to electrostatic charging, which causes still further difficulties, particularly with the pulverized flakes.

The abovementioned difficulties can be largely overcome by forming the DPP into prills. These DPP prills may be prepared generally by means of the so-called prilling process used in the manufacture of granular fertilizer. In this process the substance to be prilled is melted, and then sprayed, at a temperature close to the melting point, so that the molten droplets thus formed are allowed to fall through a gaseous medium with simultaneous direct cooling thereof. The DPP is thereby solidified, the drops forming the granules or prills.

However, efforts to prill DPP have not been successful, and this invention has discovered the required inter-relationship of the prilling conditions which will lead to usefully superior products. For instance, it has been observed that prills with a particle size below about 0.6 mm. are so susceptible to electrostatic charging that they are not free-flowing. Further, the electrostatic charge of such a product can lead to explosive situations. In other instances where the particles size is large enough to permit free flowing, the prills still have a relatively low resistance to pulverization and, furthermore, will develop cracks after a few hours. Thus disintegration to smaller fragments during transport and storage will not be avoided. Such prills of DPP with an average diameter of approximately 1 mm., with practically no granules of less than 0.6 mm., can be prepared by the prilling process wherein the sprayed droplets are cooled down to a temperature of at most about 30° C., within a height of fall of approximately 12 meters.

GENERAL DESCRIPTION OF THE INVENTION

According to the present invention, the resistance to pulverization of DPP prills is improved, their electrostatic activity is considerably lowered, and the material has improved free flowing characteristics, if the sprayed droplets are cooled by direct cooling in a gaseous medium, preferably in air, in the additional presence of a seeding substance suspended in the gaseous coolant, and the average diameter of the granules is between 1 mm. and 2 mm. Seeding has the effect of considerably improving the quality of the final product.

If DPP is prilled in the above way to an average diameter of at least 1 mm., undesired prills are practically absent. At an average diameter of 1 mm. 67% has a diameter of between 0.75 mm. and 1.25 mm., so that the material has free flowing characteristics.

Droplets of 1 mm. average diameter may be obtained if the process of preparing the DPP prills is preferably so conducted that the droplets are solidified by cooling them to approximately 60° C. or below, in the presence of a seeding material suspended in the coolant, over an effective height of fall of approximately 7 meters. Since the DPP prills are only cooled down to about 60° C., the height of fall may be smaller than when no seeding material is suspended in the coolant, thus considerably reducing plant cost. To minimize or avoid undesirable electrostatic effects, larger granules may be produced. However, this is less attractive economically; for production of prills of 2 mm. diameter, the effective fall should be already about 50 meters.

As the normal industrial quality requirements of DPP do not allow the presence of foreign substances in the prills, DPP dust is preferably suspended in the coolant as the seeding substance. DPP prills, or flakes, which may be ground or crushed, may also be used as such. The concentration of the seeding material to be suspended in the coolant for making a product of the desired resistance to pulverization and low electrostatic activity, should preferably be 100 particles of a size not exceeding 10, per cubic centimeter of coolant.

The seeding material may be fed separately to the coolant, or may be completely or partly derived from an agitated mass of DPP prills through or along which the coolant is passed. In the event the particles are entirely derived from the agitated mass, it has been found that seeding material need be supplied only during the formation of the first prills.

EXAMPLES OF THE INVENTION

The invention will be further understood from examples of the invention.

Diphenylolpropane was prilled by means of a rotary prilling vessel turning on a vertical shaft. The DPP was fed to the vessel in the fluid state and forced out, under the influence of the centrifugal force, through holes in the vessel wall. The vessel was disposed in the top of a tower of circular section, its axis coinciding with that of the tower. The minimum cross-section of the tower is determined by the path traversed by the droplets under the influence of the initial velocity.

Droplets produced by a rotary prilling vessel show a normal distribution with a standard deviation $S = 0.25\ \bar{d}$, where $\bar{d}$ is the average droplet diameter in mm. At any value of the average diameter $\bar{d}$, 99.8% of the droplets will come within the limits $\bar{d} \pm 3.10 \times 0.25 \times \bar{d}$. An analysis of the size distribution of prills of increasing diameter gives the following percentages for the numbers of prills smaller than 0.6 mm.:

| Average diameter $\bar{d}$, mm.: | Weight percentage prills <0.6 mm. |
|---|---|
| 0.7 | 28.5 |
| 0.8 | 16.0 |
| 0.9 | 9.0 |
| 1.0 | 5.5 |
| 1.2 | 2.5 |
| 1.4 | 1.0 |

A marked decrease in the percentage of prills below 0.6 mm. is observed at $\bar{d}=1.0$ mm. The size distribution of the prills with the required minimum average diameter $\bar{d}=1.0$ is as follows:

| Mm.: | Percent |
|---|---|
| 0.6 | 5 |
| 0.6–0.8 | 15 |
| 0.8–1.0 | 30 |
| 1.0–1.2 | 30 |
| 1.2–1.4 | 15 |
| 1.4 | 5 |

By means of a 200 mm. diameter prilling vessel provided with 0.9 mm. perforations and rotated at a speed between 420 and 240 r.p.m. in a rower of 7 m. diameter, prills with an average diameter of 0.95 mm.–1.25 mm. can be produced. The height of fall required for lowering the temperature to 60° C. and 30° C. amounts to 7 m. and 12 m. respectively. The volume of cooling air of 20° C. needed for this purpose is approximately 30,000 m.³ per hour.

EXAMPLE 1

DPP prills of 1 mm. average diameter were produced by cooling droplets of DPP, with a starting temperature of 160° C., down to 30° C. over a height of fall of 12 m., and by cooling such droplets down to 60° C. over a height of fall of 7 m., in the presence of DPP dust of a size of 10µ as seeding material, suspended in the coolant. The prills were subsequently tested for their resistance to pulverization, by shaking in a horizontally disposed cylinder for half an hour at a frequency of 210 vibrations/minute. After this treatment the percentage of particles smaller than 0.42 mm. was taken as a measure of the resistance to pulverization. The results were as follows:

Not seeded: 11.5% particles 0.42 mm.
Seeded: 0.4% particles 0.42 mm.

The seeded prills had a significantly higher resistance to pulverization.

The crushing strength of the above-mentioned DPP prills was determined as follows. A prill was exposed to a load which was increased at the rate of 2 kg./20 sec. until the prill broke. This load is a measure of the crushing strength. The results were as follows::

Not seeded: nil
Seeded: 4.4 kgs. (mean of 10 measurements)

The seeded prills were thus significantly stronger.
The electrostatic charge of DPP prills was also determined. The results were as follows:

Not seeded: 5.5 kv. charge
Seeded: 0.65 kv. charge

The seeded prills thus had a significantly lower electrostatic charge.

EXAMPLE 2

DPP prills were made with simultaneous cooling, using various quantities of DPP as seeding material, suspended in the coolant. The prills formed were evaluated according to the above specifications on a consistent basis either as "good prills," i.e. prills resistant to pulverization, high crushing strength and low electrostatic activity, and "unsuitable prills." The results were as follows:

| Quantity of suspended seeding material in particles/cm.³, size 10µ: | "Good" DDP prills, percent |
|---|---|
| — | 17 |
| 52 | 98.5 |
| 117 | 99 |
| 143 | 99 |

At a concentration of 100 particles/cm.³ of size 10µ, the percentage of "unsuitable prills" was negligible.

What is claimed is:
1. The process for the preparation of free flowing solid prills of diphenylolpropane having improved pulverization resistance which consists essentially in spraying molten diphenylolpropane into a gaseous medium containing a controlled amount of a finely divided seeding material suspended therein to form molten droplets, and cooling the molten droplets in said gaseous medium to a temperature of about 60° C. within an effective height of fall of about 7 meters, thereby obtaining prills having an average particle size of between about 1 mm. and 2 mm.
2. The process of claim 1 wherein said seeding material is diphenylolpropane dust.
3. The process of claim 2 wherein said seeding material has a particle size less than 10 microns and is suspended in said gaseous medium at a concentration of not more than 100 particles per cubic centimeter.
4. The process of claim 1 wherein said seeding material is supplied to said gaseous medium.

References Cited

UNITED STATES PATENTS 3,255,036   6/1966   Kramer et al. _____ 264—7

FOREIGN PATENTS 731,523   4/1966   Canada.

ROBERT F. WHITE, Primary Examiner
J. R. HALL, Assistant Examiner